H. W. B. GRAHAM.
PALLET FEEDING MECHANISM.
APPLICATION FILED APR. 12, 1918.
1,434,608.
Patented Nov. 7, 1922.
3 SHEETS—SHEET 1.
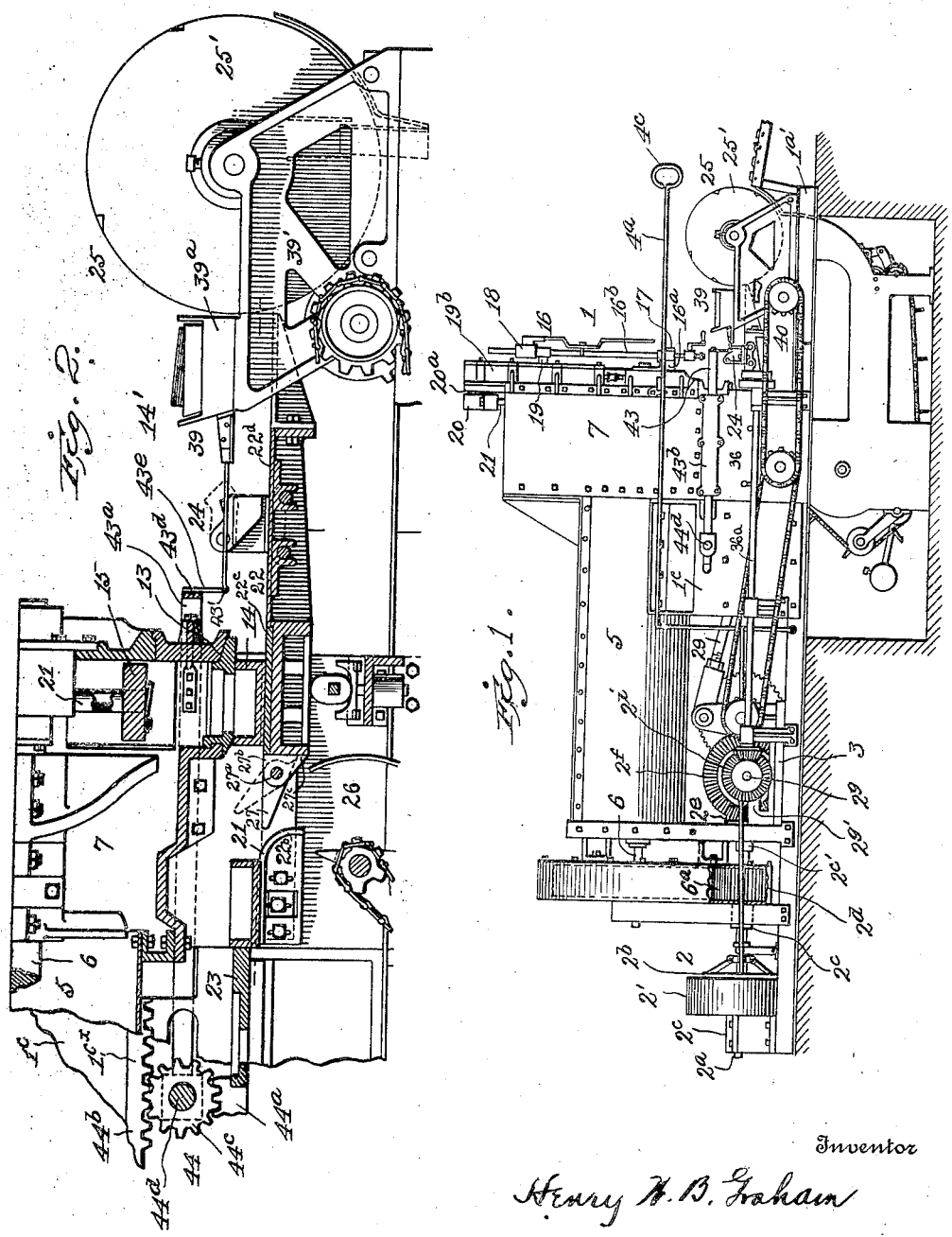
Inventor
Henry W. B. Graham
By Edward R. Alexander
Attorney

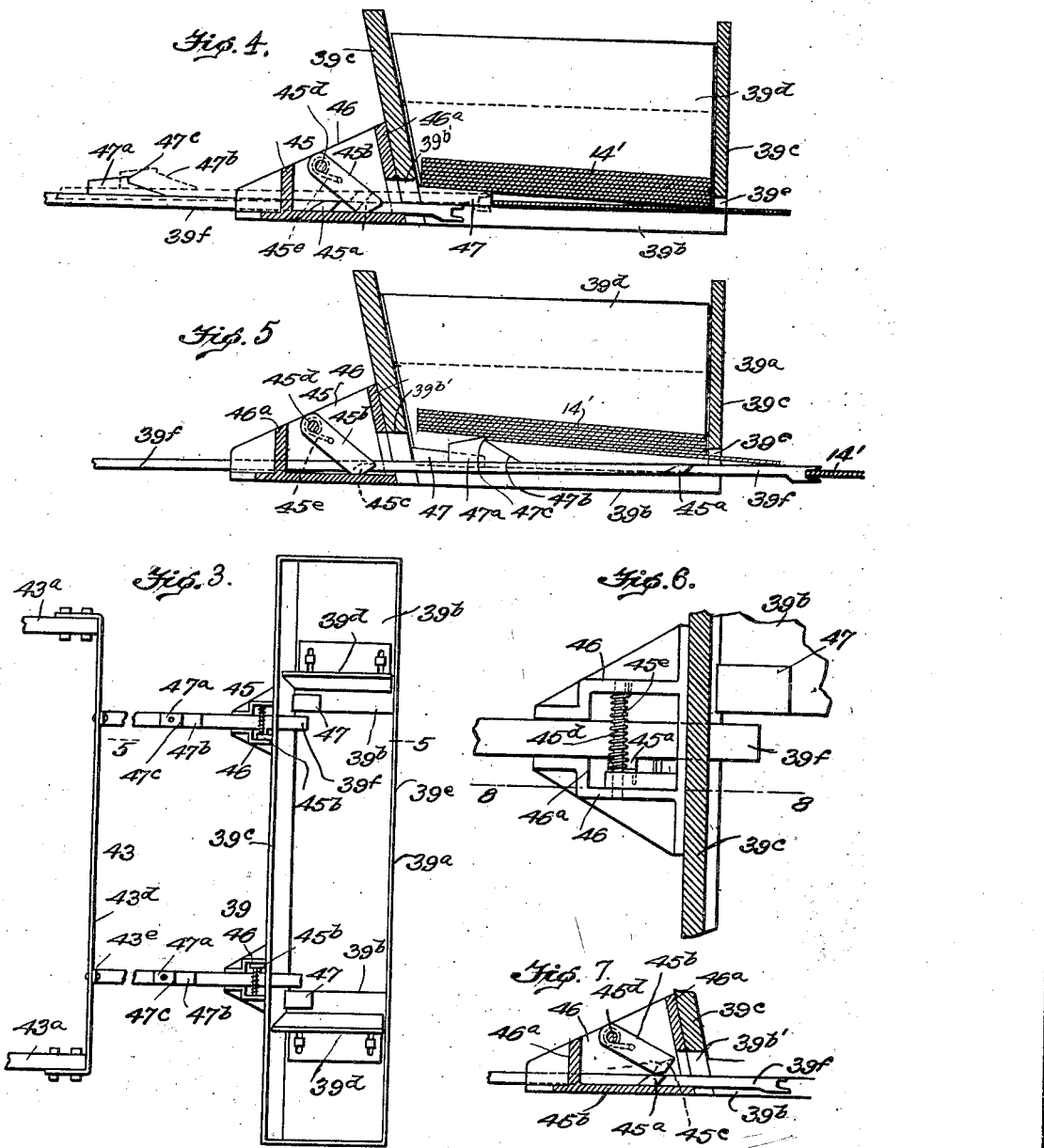

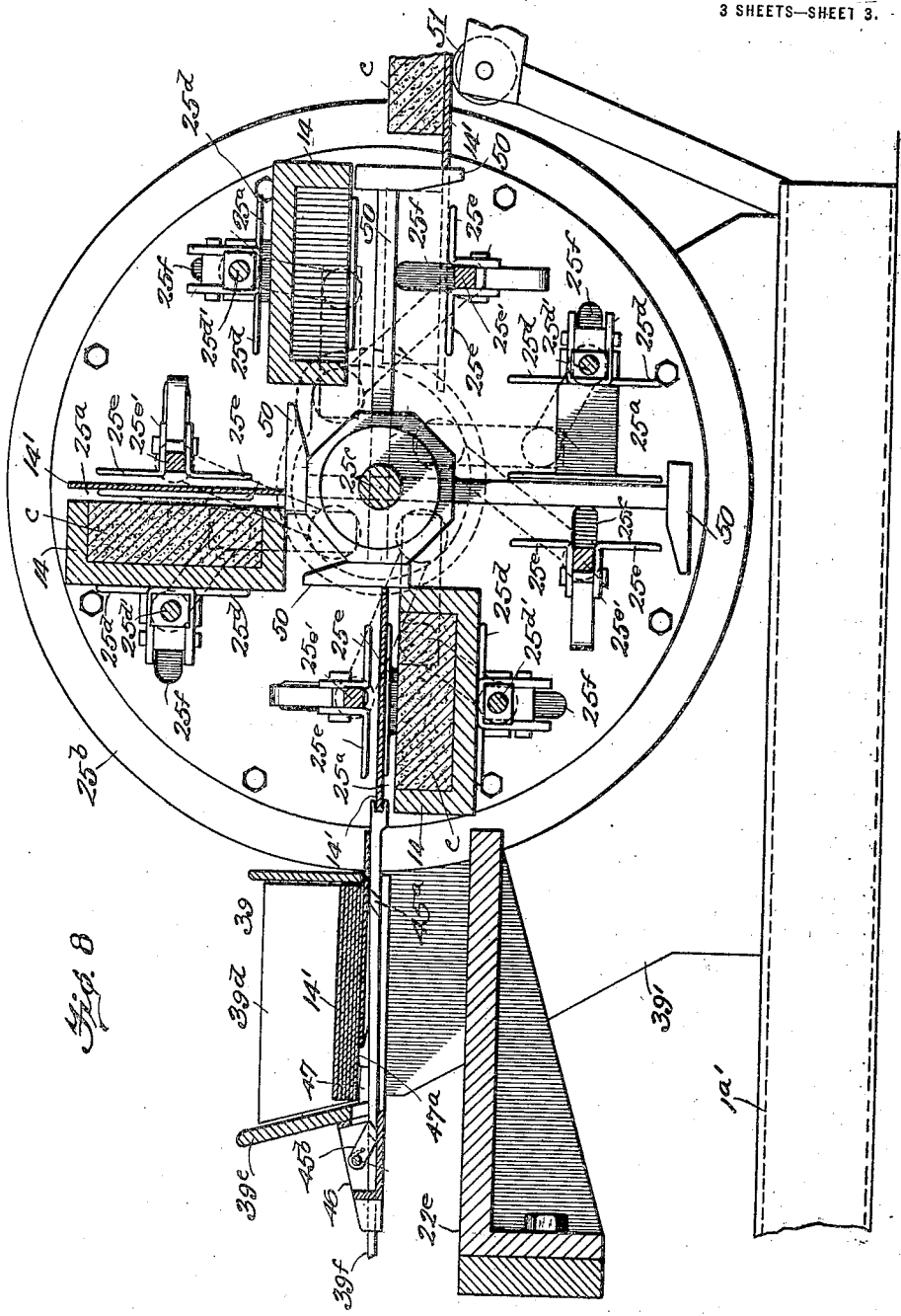

Patented Nov. 7, 1922.

1,434,608

UNITED STATES PATENT OFFICE.

HENRY W. B. GRAHAM, OF NEW LONDON, OHIO, ASSIGNOR TO THE ARNOLD-CREAGER COMPANY, OF NEW LONDON, OHIO, A CORPORATION OF OHIO.

PALLET-FEEDING MECHANISM.

Original application filed March 9, 1916, Serial No. 83,052. Divided and this application filed April 12, 1918. Serial No. 228,080½.

*To all whom it may concern:*

Be it known that I, HENRY W. B. GRAHAM, a citizen of the United States, residing at New London, in the county of Huron and State of Ohio, have invented certain new and useful Improvements in and Relating to Pallet-Feeding Mechanism, of which the following is a specification.

This invention relates to apparatus for molding bricks, particularly to the mechanism for feeding pallets to or in operative relation to the filled molds.

The object of the invention is to provide improved mechanism for feeding or delivering pallets to the filled molds or to a position to receive the bricks as they are dumped therefrom.

This and other objects of the invention will be apparent to those skilled in the art from the following description taken in connection with the accompanying drawings.

This application is a division of my copending application Ser. No. 83,052, filed March 9, 1916.

For the purpose of illustration I have, in the accompanying drawings shown and herein described one form of mechanism embodying my invention.

Fig. 1 is a side elevation of a brick making apparatus having a pallet feeding mechanism embodying my invention.

Fig. 2 is a fragmentary central longitudinal sectional view of the apparatus, somewhat enlarged.

Fig. 3 is a top plan view of the pallet supply and feeding device.

Fig. 4 is a transverse sectional view on the line 5—5 of Fig. 3.

Fig. 5 is a view similar to Fig. 4, but showing the operation of a thrust member.

Fig. 6 is a fragmentary view of parts of the pallet feeding mechanism, somewhat enlarged.

Fig. 7 is a sectional view on the line 8—8 of Fig. 6.

Fig. 8 is a fragmentary side elevation, partly in section.

In the drawings, 1 indicates as an entirety an apparatus for making brick. The apparatus includes a pug-mill 5 and a charging chamber 7 in which is mounted a press platen 15. The press platen operates to push the material through a die 13 into suitable molds 14 which are successively positioned therebelow by a mold push-out 23.

2 indicates as an entirety the driving mechanism for the apparatus. The driving mechanism 2 comprises a shaft $2^a$, mounted in bearings $2^c$, $2^c$, $2^{c'}$, which may be of any suitable construction. $2'$ indicates a pulley loosely mounted on the shaft $2^a$, and adapted to be driven by a belt from some suitable source of power to drive the shaft $2^a$ through a clutch member $2^b$. Intermediate its ends, the shaft $2^a$ carries a pinion $2^d$ for a purpose to be later described, and at its forward end the shaft $2^a$ carries a bevel pinion $2^e$, which meshes with and drives a bevel gear $2^f$, fixed to a transverse shaft $2^g$. The shaft $2^g$ is preferably supported at or near its opposite ends in bearings provided in arms $2^{g'}$ of base blocks 3. At one end, the shaft $2^g$ carries a spur gear not shown and at its opposite end it carries a bevel gear $2^j$. The purpose of these gears will be latter described.

$4^a$ indicates a set of connected links and rods connected at one end in any desired manner to the movable member of the clutch $2^b$. $4^c$ indicates a handle connected at the opposite or front end of the connected links and rods $4^a$, by means of which an operative is enabled to start and stop the apparatus from its front end.

6 indicates the pug-mill shaft which extends through the charging chamber 7 and pug-mill 5. At its rear end the shaft 6 carries a gear $6^a$ which meshes with the pinion $2^d$, whereby said gear and shaft are rotated.

16 indicates as an entirety the mechanism for reciprocating the press-platen. Of this mechanism, $16^a$ indicates a crank fixed to the front end of the pug-mill shaft 6. $16^b$ indicates a pitman connected at its lower end through a wrist pin 17 with the crank $16^a$ and at its upper end pivotally connected through a block 18 to a projection or shaft 19 of a reciprocating member or plunger not shown. $19^b$ indicates guides provided on the front of the charging chamber 7 for the plunger.

As the pitman, adjustable connections therefor, the safety connections and operating means for the latter, disclosed herein, form no part of the present invention, but are covered in a companion case, Ser. No. 228,641½, they will not be further described herein. 20 indicates a cross bar or yoke that may be connected to the reciprocating member by an inwardly projecting shaft or rod 20ª. 21 indicates one or more rods connecting the cross bar 20 with the press-platen 15.

21 indicates a receiver onto which the empty molds are successively delivered or positioned ready to be moved forward to the mold filling station, as will be later set forth.

22 indicates a base or platform the rear portion of which is arranged below the die 13. It serves to support the molds 14 as they are moved to or below the die 13, then to a bumping mechanism, indicated as an entirety at 24, and finally to an inverting mechanism indicated as an entirety at 25.

As shown, the receiver 21 is spaced from the rear end of the base 22 to provide a passageway 26 through which the empty molds 14 are successively passed and delivered to the receiver 21. The passageway 26 is normally closed by a gate preferably comprising two spaced arms 27 (only one being shown) fixed to a shaft 27ª which is loosely mounted in lugs 27ᵇ extending rearwardly from the base section 22ᶜ. Each arm 27 carries a foot 27ᶜ to engage with the rear wall of the base section 22ᶜ and limit the downward movement of the arms 27. The gate arms 27 are arranged to be swung upwardly by a moving mold 14 (see Fig. 2), whereby the latter may pass through the passageway 26.

The reciprocating feeder or mold pushout 23 serves to successively move the molds 14 from the mold receiving station 21 to the filling position immediately below the die 13. The feeder 23 may consist of a horizontally arranged plate extending across the space between the opposite inner walls of the frame members 1ᶜ and slidably supported thereon by means of suitable guides.

These guides serve to guide the push-out longitudinally in a horizontal plane substantially coincident with the plane of the molds, whereby it may engage therewith and move them forwardly and relative to the die and then to the bumpers 24 and the inverting mechanism 25. The push out 23 is operated by mechanism indicated at 29, one of the driving elements of which consists of the bevel gear 2ᶠ already referred to. For a detailed description of this operating mechanism reference may be made to my aforesaid original application. For the purpose of co-operation, the receiver 21 is arranged to receive and support a mold 14 as the pushout 23 is moving rearwardly but after it has passed the receiver 21. As the said pushout moves forward, it will engage with and move the mold 14 over the platform 22 the desired distance. In this connection it will be understood that when the pushout 23 engages with and moves a succeeding mold, the latter in turn pushes forward the mold or molds in front of it and thereby imparts step-by-step movement to all of the molds on the base or platform 22 to deliver them first to a position where they may be operated upon by the bumping mechanism 24 and then to the inverting and dumping mechanism 25 arranged at the front end of the base 22, as will be later set forth.

The bumping devices 24 are arranged between the die 13 and the inverting mechanism 25 to free or loosen the bricks from the mold walls ready for the dumping operation. The bumping devices 24 preferably operate to bump each mold while it is on the section 22ᵈ of the support or base 22. The bumping devices are operated by means, indicated as an entirety at 36 and these means are operated through a shaft 36ª.

The preferred form of mold inverting mechanism 25 includes a rotatable carrier 25′ adapted to be moved step by step about its axis. The carrier 25′ is provided with a series of spaced pockets 25ª, one of which is arranged to receive, during each period of rest of the carrier, a mold 14 which has been filled with material at the filling station or position and moved over the base or platform 22 by the pusher 23.

39 indicates as an entirety mechanism for supplying and delivering a pallet, indicated at 14′, to each pocket 25ª of the carrier 25′ for the purpose of placing a pallet 14′ in position to receive the bricks as they are dumped from a mold 14. The pallet supplying and delivering mechanism 39 is preferably arranged to deliver a pallet 14′ to each pocket 25ª substantially simultaneously with the delivery of a mold 14 thereto.

Of the pallet supplying and delivering mechanism, 39ª indicates a box or receptacle into which the pallets 14′ are piled in superposed order. The receptacle 39ª is preferably supported at its opposite ends on a pair of frame members 39′ slightly rearward of the carrier 25′. The frame members 39′ rest upon the sills 1ª′. The receptacle 39ª may be provided with a bottom 39ᵇ and side walls 39ᶜ. 39ᵈ indicates supplemental end walls adjustably mounted in any well known manner on the bottom 39ᵇ and arranged to properly position the pallets 14′ between the opposite ends of the receptacle. The lower edge of the front side wall of the receptacle 39ª is cut away to form between it and the bottom 39ᵇ a slot 39ᵉ through which the lowermost pallet 14′ is delivered by a thrust member or members 39ᶠ; also the bottom 39ᵇ and rear side wall 39ᶜ are cut away, as shown at 39$^{b'}$, to form ways, through which the thrust members 39$^f$ move. The slot 39$^c$ along the front of the receptacle 39$^a$ is of a size to permit only one pallet 14' to pass through it at a time. By this construction, the front wall of the receptacle 39$^a$ serves as an abutment for the pallets above the lowermost one while the latter is being fed forwardly. The free ends of the members 39$^f$ are preferably bifurcated to insure a positive engagement with the rear edge of each pallet 14'.

The thrust members 39$^f$ are preferably connected to and moved forwardly and rearwardly by a horizontally movable frame 43 which in turn may be connected, preferably by differential gearing 44, (Fig. 2) to and operated by the pusher or feeder 23. The movable frame 43 may comprise a pair of rods 43$^a$ each arranged at one side of the apparatus and supported in a box 43$^b$ which is formed with guide ways to slidably support the adjacent rod 43$^a$. Each box 43$^b$ is preferably bolted to the adjacent side plate of the charging chamber 7. At their front ends the rods 43$^a$ are connected together by a transverse bar 43$^d$ from which depend a pair of spaced arms 43$^e$ (Figs. 2 and 3). Each of the thrust members 39$^f$ may be pivotally connected at its rear end to the lower end of an adjacent arm 43$^e$, as shown at 43'.

44 indicates as an entirety mechanism for operating the frame 43. Of this mechanism 44$^a$, 44$^b$ indicate pairs of racks provided respectively on the pusher 23 and inwardly projecting walls 1$^{cx}$ on the side plates 1$^c$, and gears 44$^c$ each interposed between and meshing with a pair of racks 44$^a$, 44$^b$. The gears 44$^c$ are mounted on a transverse shaft 44$^d$ which extends through slots formed in the plates 1$^c$ and has bearing at its opposite ends in the rear ends of the rods 43$^a$. When the pusher 23 is moved forwardly and rearwardly, it will cause the gears 44$^c$ to roll forwardly and rearwardly; and the gears in turn will move the rods 43$^a$ forwardly and rearwardly, but owing to the co-operation and engagement of the gears 44$^c$ with the racks carried respectively by the pusher and side plates 1$^{cx}$, the distance of travel of the rods 43$^a$ will be less than that of the pusher 23. This form of construction permits me to connect the pallet moving devices 43 directly with the reciprocating pusher 23 and at the same time provides for the proper delivery of a pallet 14' from its supply receptacle 39$^a$ to an operative position above each mold 14 in a carrier pocket 25$^a$ and in correlation with its movement from the platform 22 onto the carrier 25'. Furthermore, the provision of a differential connection between the pallet moving devices 43 and the mold pusher 23 tends to simplify the construction and provide compactness in arrangement of certain parts of the apparatus.

45 indicates sets of devices which cause the thrust members 39$^f$ to positively engage the lowermost pallet 14' in the receptacle 39$^a$. Each set of devices 45 preferably comprises a member 45$^a$ extending laterally from the adjacent thrust member 39$^f$ and an operating device 45$^b$ provided with a foot 45$^c$ having inclined or cammed front and rear walls. The operating device 45$^b$ is pivotally mounted on a shaft 45$^d$ mounted in the side walls 46 of a box 46$^a$ fixed to the rear wall 39$^c$ of the receptacle 39$^a$. The bottom plate 46$^b$ of the box 46$^a$ is preferably disposed in a plane slightly below the bottom 39$^b$ and serves to support and guide the free ends of the feeders or thrust members 39$^f$ rearwardly and also forwardly, except when elevated into engagement with a pallet 14'. The foot 45$^c$ of the operating device 45$^b$ is arranged in the path of movement of the laterally extending member 45$^a$. In the forward movement of the thrust member or feeder 39$^f$, the member 45$^a$ will therefore engage the foot 45$^c$ and ride up the rear inclined wall thereof, as shown in dotted lines in Fig. 5, thus elevating the thrust member 39$^f$ about its pivot into position to engage the rear edge of the lowermost pallet 14'. In the rearward movement of the thrust member 39$^f$, the laterally extending member 45$^a$ will engage the front inclined wall of the foot 45$^c$ and cause the operating member to swing upwardly, as shown in Fig. 8; as a result of this operation, the foot 45$^c$ will be moved out of the path of the member 45$^a$. The laterally extending member 45$^a$ is preferably provided with front and rear inclined walls for engagement with the foot 45$^c$. 45$^e$ indicates a spring, preferably coiled about the shaft 45$^d$; one end of the spring is fixed to the box 46$^a$ and its opposite end is connected to the operating member 45$^b$ for the purpose of yieldingly maintaining the latter against the bottom 46$^b$.

47 indicates one or more devices arranged on the bottom 39$^b$ near the rear side of the receptacle 39$^a$ and adapted to support the rear edges of the pallets 14' above the bottom 39$^b$, as shown in Figs. 3, 4 and 5. 47$^c$ indicates a pusher fixed in any well known manner to each feeder 39$^f$. Each pusher 47$^a$ has an inclined wall 47$^b$ and an abutment 47$^c$. The pusher 47$^a$ is so positioned on the feeder 39$^f$ that in the forward movement of the latter, to feed a pallet 14' to a pocket in the carrier, it will engage the lowermost pallet 14' and push it beyond the front ends of the supporting devices 47, where it will drop onto the bottom 39$^b$ in position to be actuated by the thrust members 39$^f$. The pusher 47$^a$ not only serves to partially feed the lowermost pallet 14' forwardly, but serves also to separate it from the pallets above it in order that the feeders 39ᶠ will engage but one pallet at a time. The abutments 47ᶜ are of less height than the thickness of a pallet so that but one of the latter will be engaged. In the forward movement of the feeder 39ᶠ, the inclined wall 47ᵇ moves underneath and engages the pallets which ride up the inclined wall. By this operation the lowermost pallet is elevated into position to be engaged by the abutment 47ᶜ. From the foregoing description it will be seen that the supports 47 and pushers 47ᵃ co-operate to effect a partial feeding and the separation of the lowermost pallet 14′ from the pile of pallets in the box 39ᵃ to insure the delivery by the feeders 39ᶠ of but one pallet 14′ in each forward movement.

The carrier 25′ may comprise a pair of spaced annular members 25ᵇ connected to a shaft 25ᶜ. The shaft is supported at its opposite ends in bearings in the frame members 39′. The mold receiving pockets 25ᵃ are uniformly spaced around the shaft 25ᶜ and supported by and between the members 25ᵇ, each pocket 25ᵃ being preferably arranged substantially diametrically opposite one of the other pockets 25ᵃ on the carrier. Each pocket 25ᵃ preferably comprises pairs of opposing plates 25ᵈ, 25ᵈ, and 25ᵉ, 25ᵉ, between which are delivered a mold 14 and a pallet 14′, the latter by the pallet delivery devices 39ᶠ. The plates 25ᵈ, 25ᵈ, are secured to a transverse rod 25ᵈ′; the plates 25ᵉ, 25ᵉ, are secured to a transverse rod 25ᵉ′; and the opposite ends of said rods 25ᵈ′, 25ᵉ′, extend through elongated aligned openings 25ᶠ in the side plates of the annular members 25ᵇ where they are connected to suitable slide blocks which support and control their movements.

From Fig. 8 it will be noted that each mold 14 is delivered to a pocket 25ᵃ with a pallet 14′ on top thereof and when the carrier 25′ is rotated a one half turn about its axis, the mold 14 is inverted so that the bricks will fall onto the pallet 14′, as shown in dotted lines in Fig. 8. Thereafter the mold and pallet with the dumped bricks thereon may be separated and the latter moved onto the conveyor 51, as set forth in my original application Ser. No. 83,052.

The carrier 25′ is rotated step by step by any suitable power transmitting devices, such, for example, as indicated as an entirety at 40, to provide intervals of rest during which molds 14 and pallets 14′ are delivered to the pockets 25ᵃ successively and the pallets discharged successively therefrom.

Starting with a mold 14 which has been delivered to the receiver 21, as shown in Fig. 2, from this position the mold is pushed forward by the push-out 23 over the gate 27 to a predetermined position on the base 22 in registry with the die 13. When the mold is in this position, the press-platen 15 moves downwardly and forces the material into the mold. The press-platen then returns upwardly. In the meantime, the mold push-out 23 has returned to its rear position ready to move another mold forward. In the next forward movement of the mold push-out the succeeding mold 14, which has been moved up through the gap 26 and positioned on the receiver, is moved forwardly to the predetermined position for filling and it in turn engages with and moves the first mold forwardly along the platform 22. This operation is repeated, so that each time a mold is pushed forwardly to the filling position, the molds in front thereof are moved forwardly over the platform or support 22 to the inverting mechanism 25. As the molds come to a position of rest in line with the bumping mechanism 24 they are bumped thereby sidewise or transversely of the support, the effect of which is to cause the bricks to become loosened from the walls of the mold. As the forwardmost mold on the support 22 is moved onto the carrier 25′, the pallet delivery mechanism 39 operates substantially simultaneously to move a pallet 14′ with the mold onto the carrier 25′. After the mold and pallet have been delivered to the carrier 25′, the driving mechanism therefor rotates the carrier one step to bring the succeeding pocket 25ᵃ into position to receive the succeeding mold and pallet, this operation being repeated each time a pocket 25ᵃ arrives at the receiving position. As each pocket passes the vertical and commences to descend in its movement with the carrier, the bricks in the mold 14 carried by the pocket are dumped onto the pallet 14′, the weight of which causes the pocket members to move away from each other to separate the mold from the bricks. This operation is completely effected as the pocket arrives at the discharge position. When the carrier 25′ reaches this position, the mold push-out, acting through the molds on the support 22, moves the then forwardmost mold 14 onto the carrier, as just described, which mold in turn through the pallet discharge devices 50 engages with the pallet carrying the dumped bricks at the discharge position and moves it onto the discharge device 51. As the carrier again rotates to bring the pocket, from which the dumped bricks have just been removed, to the receiving position, the empty mold slides outwardly and downwardly as shown in dotted lines in Fig. 2.

The pallet feeding mechanism is preferably arranged above and in the same vertical plane as the mold support, and the molds are preferably moved in a substantially horizontal plane by the mechanism which moves the molds forwardly. This results in providing a relatively simple form of construction. Again, the construction is further simplified by arranging the pallet feeding mechanism between the charging chamber frame and the inverting mechanism 25.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. The combination of a support adapted to hold one or more pallets, a thrust member normally disposed in a plane below the lowermost pallet on said support, but arranged to be elevated to engage and feed forward the lowermost pallet, means for moving said thrust member forwardly and rearwardly, and means for elevating said thrust member while moving forwardly, said elevating means including a pivoted member which is swung by said thrust member out of its path of movement rearwardly.

2. The combination of a support adapted to hold one or more pallets, a thrust member normally disposed in a plane below the lowermost pallet on said support, but arranged to be elevated to engage and feed forward the lowermost pallet, means for moving said thrust member forwardly and rearwardly, means for elevating said thrust member while moving forwardly, and means for feeding forwardly and positioning the next succeeding pallet ready to be engaged by said thrust member in its next forward movement.

3. The combination of a support adapted to hold one or more pallets, a thrust member normally disposed in a plane below the lowermost pallet on said support, but arranged to be elevated to engage and feed forward the lowermost pallet, means for moving said thrust member forwardly and rearwardly, means for elevating said thrust member while moving forwardly, and means for feeding forwardly and positioning the next succeeding pallet during the forward movement of said thrust member ready to be engaged thereby in its next forward movement.

4. The combination of a support adapted to hold one or more pallets, a thrust member normally disposed in a plane below the lowermost pallet on said support, but arranged to be elevated to engage and feed forward the lowermost pallet, means for moving said thrust member forwardly and rearwardly, means for elevating said thrust member while moving forwardly, and means carried by said thrust member for feeding forwardly and positioning the next succeeding pallet during the forward movement of said thrust member ready to be engaged thereby in its next forward movement.

5. In apparatus of the class described, the combination of a support for pallets, a thrust member movable forwardly and rearwardly below said support, co-operating devices arranged to permit movement of said member rearwardly below said pallets but to elevate it into engagement with the lowermost pallet as said member moves forwardly, said devices including a pivoted member carried by said support, and means for moving said thrust member forwardly and rearwardly.

6. In apparatus of the class described, the combination of a support for pallets, a thrust member movable forwardly and rearwardly below said support, co-operating devices arranged to permit movement of said member rearwardly below said pallets but to elevate it into engagement with the lowermost pallet as said member moves forwardly, said devices comprising a lug on said thrust member and element pivoted to said support, and means for moving said thrust member forwardly and rearwardly.

7. The combination of a holder adapted to hold one or more pallets, a thrust member for moving the lowermost pallet forwardly, means comprising an incline on which the pallets ride and an abutment at the upper end of said incline arranged to engage the next succeeding pallet for positioning it ready for engagement by said thrust member, means for operating said thrust member, and means for elevating said thrust member while it moves forwardly.

8. The combination of a holder adapted to hold one or more pallets, a thrust member for moving the lowermost pallet forwardly, means comprising an incline on which the pallets ride and an abutment arranged to engage the next succeeding pallet for positioning it ready for engagement by said thrust member, said abutment being of less height than the thickness of a pallet, means for operating said thrust member, and means for elevating said thrust member while it moves forwardly.

9. The combination of a holder adapted to hold one or more pallets, a thrust member for moving the lowermost pallet forwardly, means comprising an incline on which the pallets ride and an abutment carried by said thrust member and arranged to engage the next succeeding pallet for positioning it ready for engagement by said thrust member, means for operating said thrust member, and means for elevating said thrust member while it moves forwardly.

10. The combination of a pallet holder comprising a bottom and a front wall formed with an opening adjacent thereto, of a reciprocable thrust member arranged in a plane below the upper surface of said bottom, a pair of engaging members, one carried by said thrust member and the other being swingably supported, for elevating the front end of said thrust member into position to engage and feed forward through the opening the lowermost pallet, the swingably supported member being movable laterally by the other member out of its path during the return of said thrust member, and means for reciprocating said thrust member.

11. In apparatus of the character described, the combination of a pallet holder, a reciprocating element, a thrust member pivoted to and moved forwardly and rearwardly by said reciprocating element, and a pair of devices carried by said member and arranged to feed forward the lowermost pallet and next adjacent pallet at each forward movement of said member.

12. In apparatus of the character described, the combination of a pallet holder, a reciprocating element, a thrust member pivoted to and moved forwardly and rearwardly by said reciprocating element, and a pair of devices carried by said member and arranged to feed forward the lowermost pallet and next adjacent pallet at each forward movement of said member, and means for elevating the front end of said member as it moves forwardly.

13. In apparatus of the class described, the combination of a support for a pile of pallets, devices simultaneously operating to feed the lowermost pallet forwardly and to move the next adjacent into position ready to be fed forwardly, and means for elevating the device which feeds the pallet forwardly into engagement therewith after it passes the rear edge of the pallet pile.

14. In a brick making machine, the combination of a holder on which pallets are supported in a pile or stack, and means for successively feeding the pallets into operative relationship with brick molds, said means comprising a device for moving each pallet into feeding position with its rear edge forward of the rear edge of the pallet pile, a separate device for feeding each positioned pallet forwardly, and means operating after said separate device has passed the rear edge of the pallet pile to elevate it into engagement with each positioned pallet.

In testimony whereof, I have hereunto signed my name.

HENRY W. B. GRAHAM.